UNITED STATES PATENT OFFICE.

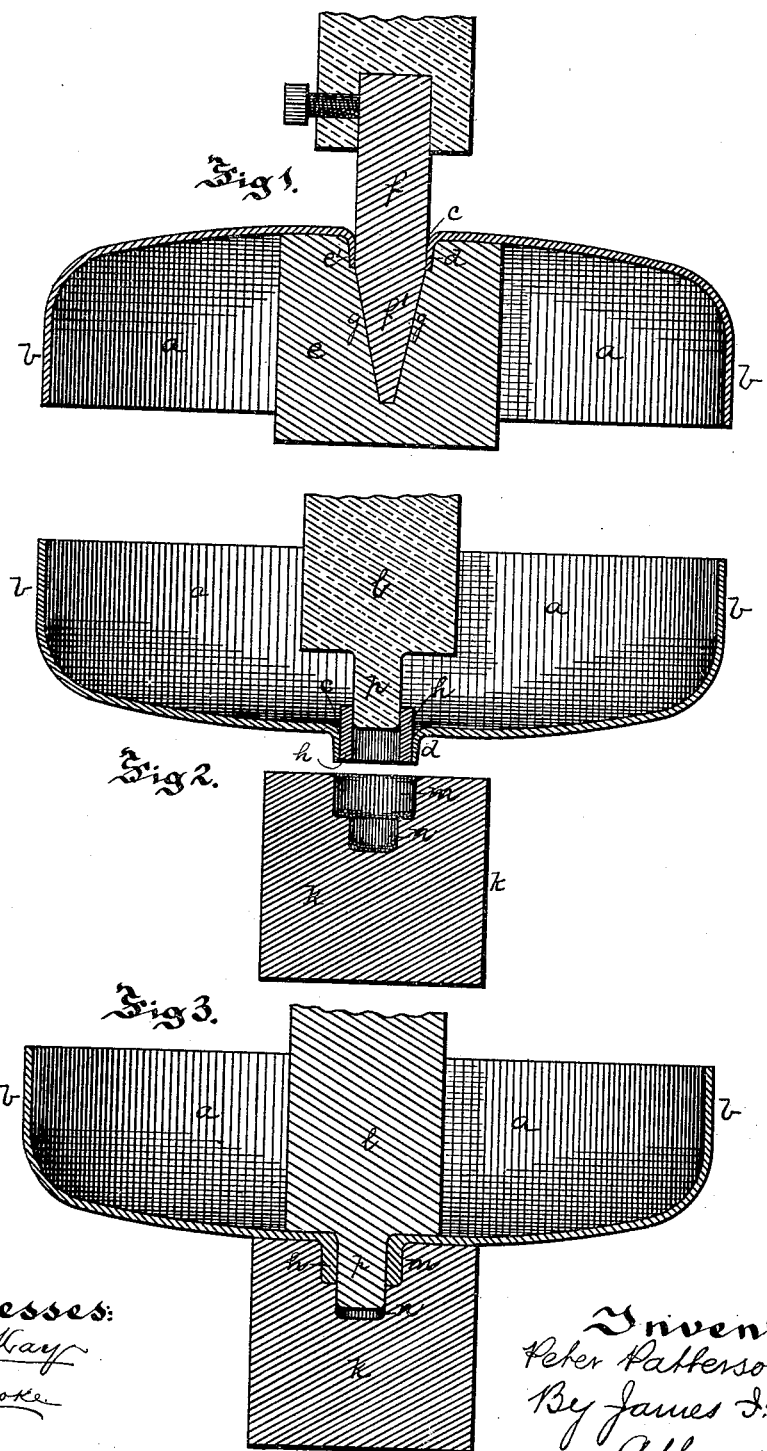

PETER PATTERSON, OF McKEESPORT, PENNSYLVANIA, ASSIGNOR OF ONE-HALF TO THE NATIONAL TUBE WORKS COMPANY, OF SAME PLACE AND OF BOSTON, MASSACHUSETTS.

METHOD OF SECURING RINGS IN BOILER-HEADS.

SPECIFICATION forming part of Letters Patent No. 329,335, dated October 27, 1885.

Application filed July 31, 1885. Serial No. 173,174. (No model.)

*To all whom it may concern:*

Be it known that I, PETER PATTERSON, of McKeesport, in the county of Allegheny and State of Pennsylvania, have invented a new and useful Improvement in Methods of Securing Rings in Boiler-Heads; and I do hereby declare the following to be a full, clear, and exact description thereof.

My invention relates to boiler-heads employed with boilers or reservoirs for heated water, or with reservoirs for storing any particular fluid under pressure, such as the reservoirs employed in connection with air-brake systems. These boiler-heads are flanged around the outer edge to attach them by welding or riveting to the cylindrical part of the boiler or reservoir, and the attachments to the boiler or reservoir are generally made within these boiler-heads, a sufficient thickness of metal for this purpose being obtained by securing what are termed "snugs" or "rings" in the boiler-head, these rings being subsequently tapped for connecting pipe to the reservoirs. Heretofore these snugs or rings have been secured to the boiler-head by riveting on each face thereof, around a hole or eye punched through the boiler-head, rings of metal, and tapping through these rings, and the inner edge of the eye punched within the boiler-head. They have also been secured in place by punching an eye through the boiler-head, inserting a heated ring therein, and upsetting this ring by suitable tools, the metal being spread over each edge of the boiler-plate around the eye, and a mechanical connection between the boiler-head and the ring being thus obtained. In both these cases the connection between the ring and the boiler-head has been merely mechanical, and it is evident that a perfectly-tight joint could not always be obtained. By my invention I am enabled to secure these snugs or rings within the boiler-head in such manner as to form a perfect union between the metal of the ring and that of the boiler-head, and thus overcome all the objections found to the method heretofore employed for securing the rings in the boiler-head.

My invention consists, essentially, in inserting the ring within a suitable eye in the boiler-head, and when so inserted heating that portion of the boiler-head and the ring to a welding heat and welding the ring thereto, thus forming a perfect union between the ring and the boiler-head.

It also consists in flanging out the metal around the eye within which the ring is inserted, inserting the ring, bringing the ring and that portion of the boiler-head to a welding heat, and welding the ring therein, a much stronger union being obtained in this manner, because the ring may be welded to a larger surface of the metal of the boiler-head.

To enable others skilled in the art to practice my invention, I will describe the same more fully, referring to the accompanying drawings, in which—

Figure 1 illustrates the method of and dies for spreading or flanging the metal around the hole within which the ring is inserted. Fig. 2 illustrates the boiler-head having the ring inserted therein ready for welding and the dies employed therefor, and Fig. 3 illustrates the boiler-head having the ring welded therein, it also showing the position of the dies after welding and before the head is removed therefrom.

Like letters of reference indicate like parts in each.

The boiler-head $a$ is formed of wrought-iron or steel, being formed of a circular plate, around which is formed the annular flange $b$, by means of which it is afterward riveted or welded to the cylindrical portion of the boiler or reservoir, the plate being flanged by any suitable apparatus. In said plate is formed the hole or eye $c$, and around this eye is formed the flanged portion $d$, the method preferred by me for forming this flange around the eye $c$ being illustrated in the drawings, a suitable hole being first punched in the center of the eye $c$, and the head being then brought to the proper heat and placed over the anvil or stationary die $e$ under the reciprocating flanging-tool $f$, this tool having the tapering portion $f'$, the end of which enters the hole formed in the center of the eye, and as it is forced down into the cavity $g$, formed in the anvil $e$, for the reception of the base of the tool, the tool spreading the metal of the eye, as illustrated in the drawings, and pressing it out into the seat $e'$, formed in the anvil above the cavity $g$ for the reception of this flange $d$, thus forming the flange $d$ around the eye $c$. After the formation of this flange $d$ around the eye $c$, the snug or ring $h$, formed of a short section of pipe, or of a socket of suitable length, is inserted into the eye and within the flange portion $h$ thereof. This portion of the boiler-head is then brought to a welding heat within a suitable furnace, and the boiler-head is then placed over the anvil $k$, above which works the reciprocating welding-tool or hammer $l$. In the anvil $k$ is formed the matrix $m$, corresponding in shape to the finished ring when welded within the boiler-head, and at the base of this matrix is the depression or cavity $n$, to receive the base of the teat $p$ of the welding-tool $l$, as shown in Fig. 3. The teat $p$ of the hammer $l$ corresponds in diameter to the interior diameter of the finished snug or ring when welded to the boiler-head, and during the welding of the ring to the boiler-head passes through the same. After the boiler-head, having the ring $h$ inserted therein, is brought to a welding heat, it is placed over the anvil $k$, and as the welding-tool $l$ descends the teat $p$ enters within the ring $h$, the flange $d$ around the eye $c$, and the ring $h$ being driven by this welding-tool down into the matrix $m$ in the anvil $k$, and by one or more blows the ring $h$ being welded firmly to the boiler-head, while at the same time any surplus metal of the ring is spread out, as shown in Fig. 3, so that the upper surfaces of the ring and boiler-head are substantially flush with each other. During the welding operation the teat $p$ enters the ring $h$, and so prevents the bending of the ring out of shape during the welding operation and forms the interior wall of the matrix, within which the parts are compressed and brought to proper shape, the base of the teat entering the cavity $n$ at the base of the matrix $m$.

By my improved method of securing these rings to the boiler-heads I form a perfect weld between the ring and boiler-head, and thus obtain a much more perfect union than can be obtained by the ordinary mechanical unions heretofore employed for the purpose, the ring being thus perfectly welded to the boiler-head, and so forming a part thereof. The operation is simple and can be easily carried out, requiring but simple forms of dies, so that the rings can be secured in place in this manner in the boiler-head at less expense than where they are secured therein by mechanical means, as before referred to. In employing the flange $d$ around the eye $c$ of the boiler-head I obtain a large surface for welding between the ring and the metal of the boiler, and thus obtain a much more perfect union.

What I claim as my invention, and desire to secure by Letters Patent, is—

1. The herein-described method of securing snugs or rings within boiler-heads, consisting in inserting the ring within the eye of the boiler-head, raising the ring and boiler-head to a welding heat, and welding the parts together.

2. The herein-described method of securing snugs or rings within boiler-heads, consisting in flanging the metal around the eye of the boiler-head, inserting the ring within the flanged eye, raising the parts to a welding heat, and welding the parts together.

In testimony whereof I, the said PETER PATTERSON, have hereunto set my hand.

PETER PATTERSON.

Witnesses:
 HENRY E. BOYD,
 WILLIAM F. HUGHES.